United States Patent
Yatabe

(10) Patent No.: US 12,494,799 B2
(45) Date of Patent: Dec. 9, 2025

(54) DATA COMPRESSION DEVICE, DATA COMPRESSION METHOD, AND RECORDING MEDIUM

(71) Applicant: NEC Corporation, Tokyo (JP)

(72) Inventor: Akihiro Yatabe, Tokyo (JP)

(73) Assignee: NEC CORPORATION, Tokyo (JP)

( * ) Notice: Subject to any disclaimer, the term of this patent is extended or adjusted under 35 U.S.C. 154(b) by 186 days.

(21) Appl. No.: 18/392,309

(22) Filed: Dec. 21, 2023

(65) Prior Publication Data

US 2024/0235574 A1    Jul. 11, 2024

(30) Foreign Application Priority Data

Jan. 5, 2023   (JP) .................. 2023-000568

(51) Int. Cl.
*H03M 7/00* (2006.01)
*H03M 7/30* (2006.01)

(52) U.S. Cl.
CPC .................... *H03M 7/30* (2013.01)

(58) Field of Classification Search
CPC ............................ H03M 7/30; H03M 7/3059
USPC ....................................... 341/50, 51
See application file for complete search history.

(56) References Cited

U.S. PATENT DOCUMENTS

| | | | |
|---|---|---|---|
| 9,235,651 B2* | 1/2016 | Kobayashi | G06F 16/2255 |
| 12,028,093 B2* | 7/2024 | Sugiura | H03M 7/6035 |
| 2018/0167083 A1* | 6/2018 | Dubey | H03M 7/6076 |
| 2021/0064338 A1* | 3/2021 | Emmart | H03M 7/24 |

FOREIGN PATENT DOCUMENTS

JP    2022-045609 A    3/2022

* cited by examiner

*Primary Examiner* — Jean B Jeanglaude
(74) *Attorney, Agent, or Firm* — Sughrue Mion, PLLC

(57) ABSTRACT

A data compression device determines, based on a significant figure of each of a plurality of real numbers, a step size that is a value capable of dividing without remainder each of the plurality of real numbers. The data compression device acquires integers by dividing each of the plurality of real numbers by the step size.

13 Claims, 7 Drawing Sheets

FIG. 3

|  | STUDENT A | STUDENT B | · · · | STUDENT N |
|---|---|---|---|---|
| PROBLEM 1 | 66.6% | 66.6% | · · · | 33.3% |
| PROBLEM 2 | 100.0% | 100.0% | · · · | 50.0% |
| ⋮ | ⋮ | ⋮ | ⋱ | ⋮ |
| PROBLEM n | 50.0% | 50.0% | · · · | 100.0% |

FIG. 4

|  | STUDENT A | STUDENT B | · · · | STUDENT N |
|---|---|---|---|---|
| SUBJECT 1 | 51.2 | 58.9 | · · · | 46.7 |
| SUBJECT 2 | 52.3 | 56.7 | · · · | 47.8 |
| ⋮ | ⋮ | ⋮ | ⋱ | ⋮ |
| SUBJECT n | 53.4 | 57.8 | · · · | 45.6 |

FIG. 5

|  | SAMPLE A | SAMPLE B | · · · | SAMPLE N |
|---|---|---|---|---|
| COMPONENT 1 | 12.3mg/l | 13.4mg/l | · · · | 14.5mg/l |
| COMPONENT 2 | 36.7mg/l | 35.6mg/l | · · · | 34.5mg/l |
| ⋮ | ⋮ | ⋮ | ⋱ | ⋮ |
| COMPONENT n | 23.4mg/l | 25.6mg/l | · · · | 24.5mg/l |

FIG. 6

|  | SAMPLE A | SAMPLE B | ... | SAMPLE N |
|---|---|---|---|---|
| COMPONENT 1 | 12.3mg/l | 13.4mg/l | ... | 14.5mg/l |
| COMPONENT 2 | 0.0367mg/l | 0.0356mg/l | ... | 0.0345mg/l |
| ⋮ | ⋮ | ⋮ | ⋱ | ⋮ |
| COMPONENT n | 23.4mg/l | 25.6mg/l | ... | 24.5mg/l |

FIG. 7

|  | SAMPLE A | SAMPLE B | ... | SAMPLE N |
|---|---|---|---|---|
| COMPONENT 1 | 12.3mg/l | 13.4mg/l | ... | 14.5mg/l |
| COMPONENT 2 | 36.7μg/l | 35.6μg/l | ... | 34.5μg/l |
| ⋮ | ⋮ | ⋮ | ⋱ | ⋮ |
| COMPONENT n | 23.4mg/l | 25.6mg/l | ... | 24.5mg/l |

DATA COMPRESSION DEVICE, DATA COMPRESSION METHOD, AND RECORDING MEDIUM

CROSS-REFERENCE TO RELATED APPLICATIONS

This application is based upon and claims the benefit of priority from Japanese patent application No. 2023-000568, filed on Jan. 5, 2023, the disclosure of which is incorporated herein in its entirety by reference.

TECHNICAL FIELD

The present disclosure relates to a data compression device, a data compression method, and a recording medium.

BACKGROUND ART

Data containing a plurality of real numbers is sometimes handled. For example, Japanese Unexamined Patent Application, First Publication No. 2022-045609 describes that an information processing device obtains a solution using an Ising model. The Hamiltonian of the Ising model is expressed using, for example, variables that represent quantum states and real coefficients.

SUMMARY

When data containing a plurality of real numbers is handled, it is preferable that the data volume required to represent the plurality of real numbers is small.

An example object of the present disclosure is to provide a data compression device, a data compression method, and a recording medium that are capable of solving the above problem.

According to a first example aspect of the present disclosure, a data compression device includes: a memory configured to store instructions; and a processor configured to execute the instructions to: determine, based on a significant figure of each of a plurality of real numbers, a step size that is a value capable of dividing without remainder each of the plurality of real numbers; and acquire integers by dividing each of the plurality of real numbers by the step size.

According to a second example aspect of the present disclosure, a data compression method executed by a computer includes: determining, based on a significant figure of each of a plurality of real numbers, a step size that is a value capable of dividing without remainder each of the plurality of real numbers; and acquiring integers by dividing each of the plurality of real numbers by the step size.

According to a third example aspect of the present disclosure, a non-transitory recording medium stores a program that causes a computer to execute: determining, based on a significant figure of each of a plurality of real numbers, a step size that is a value capable of dividing without remainder each of the plurality of real numbers; and acquiring integers by dividing each of the plurality of real numbers by the step size.

According to the present disclosure, it is expected that the data volume required to represent a plurality of real numbers can be made relatively small.

BRIEF DESCRIPTION OF THE DRAWINGS

FIG. 3 is a diagram showing a first example of data in the education field that is subjected to compression by a data compression device according to some example embodiments of the present disclosure.

FIG. 4 is a diagram showing a second example of data in the education field that is subjected to compression by a data compression device according to some example embodiments of the present disclosure.

FIG. 5 is a diagram showing an example of data in the chemical field that is subjected to compression by a data compression device according to some example embodiments of the present disclosure.

FIG. 6 is a diagram showing an example of data in some example embodiments of the present disclosure in which the order is different for each element.

FIG. 7 is a diagram showing an example of data in some example embodiments of the present disclosure in which the orders have been matched.

EXAMPLE EMBODIMENT

Hereunder, example embodiments of the present embodiment will be described. However, the following example embodiments do not limit the disclosure according to the claims. Furthermore, not all combinations of features described in the example embodiments may not be essential to the solution means of the disclosure.

Figure 1:
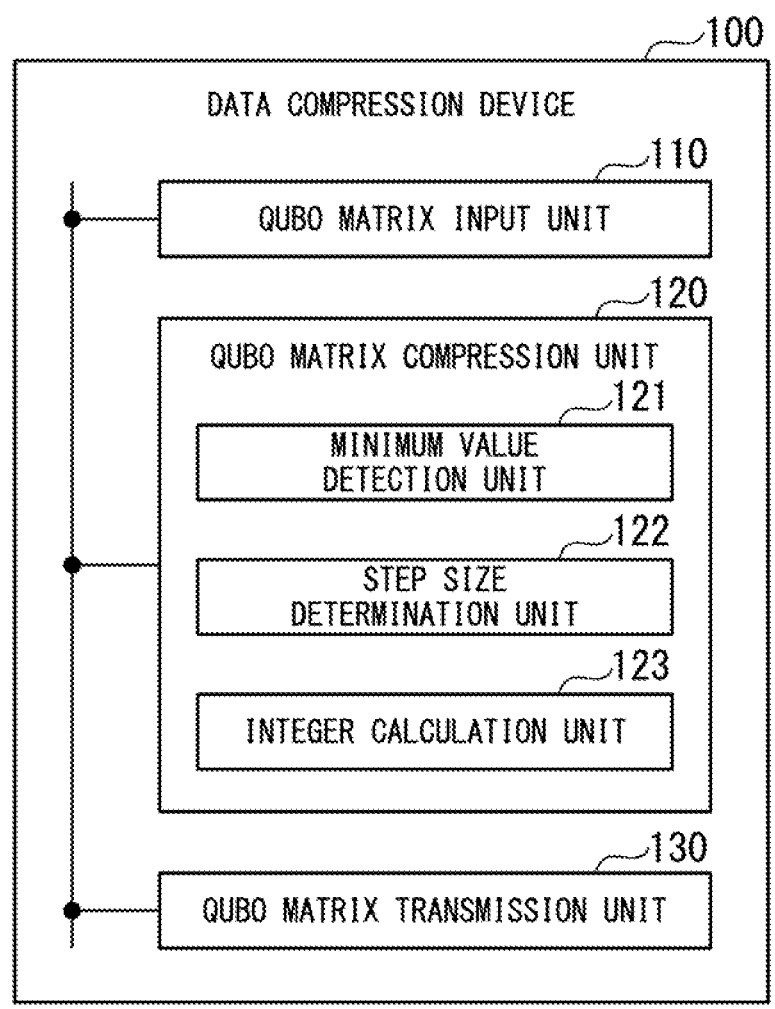
FIG. 1 is a diagram showing an example of a configuration of a data compression device according to some example embodiments of the present disclosure.

FIG. 1 is a diagram showing an example of a configuration of a data compression device 100 according to some example embodiments of the present disclosure. The data compression device 100 includes a quadratic unconstrained binary optimization (QUBO) matrix input unit 110, a QUBO matrix compression unit 120, and a QUBO matrix transmission unit 130. The QUBO matrix compression unit 120 includes a minimum value detection unit 121, a step size determination unit 122, and an integer calculation unit 123.

The QUBO matrix input unit 110 acquires data whose data volume is subjected to reduction. The reduction of data volume is also referred to as data compression.

Hereunder, a case where the QUBO matrix input unit 110 acquires a QUBO matrix consisting of real number elements (components) expressed by floating point numbers will be described as an example. Here, the QUBO matrix is expressed as a symmetric matrix having real number elements or a combination of an upper triangular matrix and a diagonal matrix. A matrix whose data volume is subjected to reduction is also referred to as a compression target matrix.

The QUBO matrix input unit 110 corresponds to an example of a data acquisition means. The QUBO matrix acquired by the QUBO matrix input unit 110 corresponds to an example of data containing a plurality of real numbers.

However, the data that is subjected to compression by the data compression device 100 is not limited to data representing a QUBO matrix, and can be a variety of data containing a plurality of real numbers. For example, the data compression device 100 may compress data representing a general matrix having real number elements expressed by floating point numbers. Furthermore, the data compression device 100 may compress time-series data of sensor measurement values expressed by real numbers.

The QUBO matrix compression unit 120 receives an input of a compression target matrix acquired by the QUBO matrix input unit 110, and reduces the number of real numbers used to represent the input matrix by representing the input matrix, which is composed of real number elements, using a matrix of integers. As a result, the QUBO matrix compression unit 120 compresses the data representing the compression target matrix. For example, the QUBO matrix compression unit 120 converts the representation format of the compression target matrix into the format shown in expression (1).

$$\text{(Smallest element)} \times \text{(First integer matrix)} + \text{(Step size)} \times \text{(Second integer matrix)} \quad (1)$$

The "(smallest element)" is the element with the smallest value among the elements of the compression target matrix. The "(first integer matrix)" is an integer matrix whose elements are all 1.

The "(step size)" is a scalar value that is determined such that the "(second integer matrix)" is expressed by integers.

The "(second integer matrix)" is an integer matrix obtained by subtracting the "(smallest element)" from each element of the compression target matrix, and then dividing (performing division with respect to) each element obtained after subtraction by the "(step size)".

The "(smallest element)" and the "(step size)" in expression (1) are each expressed by scalars. Therefore, the QUBO matrix compression unit 120 converts the data of a real number matrix into data in a representation format that does not contain a real number matrix. In this respect, the number of real numbers in the compressed data from the QUBO matrix compression unit 120 is relatively small. Since an integer requires a smaller data volume than a real number, the QUBO matrix compression unit 120 is capable of reducing the data volume required to express the compression target matrix.

The minimum value detection unit 121 detects the "(smallest element)" in expression (1). The minimum value detection unit 121 corresponds to an example of a minimum value detection means.

The step size determination unit 122 determines the "(step size)" in expression (1). The step size determination unit 122 determines the "(step size)" based on the significant figures of the differences between the elements of the compression target matrix such that each element obtained after the "(smallest element)" is subtracted from each element of the compression target matrix can be divided without remainder by the "(step size)".

Specifically, the step size determination unit 122 determines the "(step size)" based on the smallest place expressed by the non-zero numbers such that when each element is divided by the "(step size)", the smallest place expressed by the non-zero numbers becomes an integer place.

The step size determination unit 122 corresponds to an example of a step size determination means.

The integer calculation unit 123 calculates the "(second integer matrix)" in expression (1). The integer calculation unit 123 calculates the "(second integer matrix)" by subtracting the "(smallest element)" from each element of the compression target matrix, and then dividing each element obtained after subtraction by the "(step size)". The integer calculation unit 123 corresponds to an example of an integer calculation means.

The compression of data by the QUBO matrix compression unit 120 will be further described using an example. As mentioned above, the QUBO matrix input unit 110 acquires a matrix having real number elements as the QUBO matrix subjected to data compression, and outputs the matrix to the QUBO matrix compression unit 120. Expression (2) represents an example of the QUBO matrix acquired by the QUBO matrix input unit 110.

$$\begin{pmatrix} -7.98 & -20.0 & 5.0 \\ 0.0 & -8.0 & 4.96 \\ 0.0 & 0.0 & 12.03 \end{pmatrix} \quad (2)$$

The matrix acquired by the QUBO matrix input unit 110 may contain a mixture of real number elements and integer elements. For example, the element "0.0" in the example of expression (2) may be expressed by the integer "0".

The minimum value detection unit 121 extracts all elements of the compression target matrix. Then, the minimum value detection unit 121 sorts the extracted elements in ascending order or descending order. For example, when the minimum value detection unit 121 sorts the elements of the QUBO matrix in the example of expression (2) in ascending order, the numerical sequence "−20.0, −8.0, −7.98, 0.0, 0.0, 0.0, 4.96, 5.0, 12.03" is acquired as the sort result.

Then, the minimum value detection unit 121 removes duplicate elements from the sort result, and detects the smallest element. For example, the minimum value detection unit 121 removes duplicate elements from the sort results above, acquires the numerical sequence "−20.0, −8.0, −7.98, 0.0, 4.96, 5.0, 12.03", and detects the smallest element "−20.0".

The minimum value detection unit 121 uses the detected smallest element as the "(smallest element)" in expression (1).

Furthermore, the step size determination unit 122 calculates the differences between adjacent elements in the numerical sequence after removal of duplicate elements. Then, the step size determination unit 122 determines the step size based on the smallest place (decimal place) of the numerical values representing the differences. The step size determination unit 122 uses the obtained step size as the "(step size)" in expression (1).

For example, the step size determination unit 122 calculates "12, 0.02, 7.98, 4.96, 0.04, 7.03" by taking the differences between adjacent elements in the numerical sequence above. Here, the difference between "−20.0" and "−8.0" is "12.0", and the value of the decimal part is 0. Therefore, the step size determination unit 122 calculates the difference as "12".

In the above numerical sequence, the numerical values representing the differences exist at most the second decimal place (0.01 place), such as in 0.02 and 7.98. Therefore, the step size determination unit 122 determines the step size to be 0.01.

The QUBO matrix compression unit 120 rewrites the input matrix into the format shown by expression (1) using the smallest element and the step size obtained in the procedure so far, and then outputs the rewritten matrix. As described above, the minimum value detection unit 121 of the QUBO matrix compression unit 120 uses the smallest element as the "(smallest element)" in expression (1). Furthermore, the QUBO matrix compression unit 120 uses an integer matrix whose elements are all "1" as the "(first integer matrix)", which is an integer matrix to be multiplied by the "(smallest element)" in expression (1).

Moreover, as described above, the step size determination unit 122 of the QUBO matrix compression unit 120 determines the "(step size)" in expression (1) based on the difference between the elements of the QUBO matrix. Then, the integer calculation unit 123 of the QUBO matrix compression unit 120 divides the remaining values (differences) obtained after subtracting the "(smallest element)" from each element of the original matrix (compression target matrix) by the "(step size)", and generates a matrix composed of integer elements. The QUBO matrix compression unit 120 uses the obtained integer matrix as the "(second integer matrix)", which is an integer matrix that is to be multiplied by the "(step size)" in expression (1).

The conversion by the QUBO matrix compression unit 120 from the matrix of real numbers shown in expression (2) to the expression in the form shown in expression (1) is expressed by expression (3).

$$\begin{pmatrix} -7.98 & -20.0 & 5.0 \\ 0.0 & -8.0 & 4.96 \\ 0.0 & 0.0 & 12.03 \end{pmatrix} = -20.0 \times \begin{pmatrix} 1 & 1 & 1 \\ 1 & 1 & 1 \\ 1 & 1 & 1 \end{pmatrix} + 0.01 \times \begin{pmatrix} 1202 & 0 & 2500 \\ 2000 & 1200 & 2496 \\ 2000 & 2000 & 3202 \end{pmatrix} \quad (3)$$

Here, as shown in the example of expression (3), the first integer matrix has the same number of rows and columns as the second integer matrix, and is an integer matrix whose elements are all "1". Consequently, the first integer matrix can be reproduced by referring to the second integer matrix. Therefore, the QUBO matrix compression unit 120 omits the explicit description of the first integer matrix in the compressed data. As a result, the QUBO matrix compression unit 120 is capable of further reducing the data volume.

As shown in the example of expression (3), the data compression performed by the QUBO matrix compression unit 120 causes the matrix that was expressed by the same number of decimal numbers as elements in the QUBO matrix, to be expressed by two decimal numbers and the same number of integers as elements in the QUBO matrix. As mentioned above, since integers require a smaller data volume than real numbers, the QUBO matrix compression unit 120 is capable of reducing the data volume required to express a matrix.

For example, when a real number is expressed in the form of a single-precision floating point number or a double-precision floating point number, a memory volume of 4 bytes or 8 bytes is required to represent a single real number. On the other hand, integers from −32,768 to 32,767 are represented by 2 bytes of memory volume.

Alternatively, consider a case in which an integer is expressed as a variable-length bit string, and a real number is expressed in an $A \times 10^B$ format, where A and B are both integers. In this case, because the expression of an exponent part is not required to represent an integer, it is expected that the memory volume will be smaller by the amount required to represent the integer B.

In particular, when the number of elements in the compression target matrix is large and the digit numbers of significant figures of the elements of the matrix is relatively low (small), the effect of reducing the memory volume by the data compression performed by the QUBO matrix compression unit 120 is expected to become large.

When the compression target matrix is a QUBO matrix, the digit number of significant figures of the elements of the matrix is often approximately two or three, and is relatively small. Therefore, it is expected that the effect of reducing the memory volume by the data compression performed by the QUBO matrix compression unit 120 can be obtained. Furthermore, when the scale of the problem expressed by the QUBO matrix is large, the number of elements in the QUBO matrix increases, and it is expected that the effect of reducing the memory volume by the data compression performed by the QUBO matrix compression unit 120 will increase.

In addition, in the example of expression (3), "−20.0" corresponding to the "(smallest element)" in expression (1) has a value of 0 after the decimal point. In this case, the QUBO matrix compression unit 120 may express "−20.0" as a two-digit real number.

Alternatively, the QUBO matrix compression unit 120 may express "−20.0" as "−20" in an integer representation format. As a result, it is expected that the QUBO matrix compression unit 120 can further reduce the memory volume.

In this way, when the value of the "(smallest element)" in expression (1) after the decimal point is 0, the QUBO matrix compression unit 120 may express the value as a real number with the number of digits of the integer part, or express the value in an integer representation format. Similarly, when the value of the "(step size)" in expression (1) after the decimal point is 0, the QUBO matrix compression unit 120 may express the value as a real number with the number of digits of the integer part, or express the value in an integer representation format.

Next, a case where the QUBO matrix compression unit 120 compresses the matrix shown in expression (4) will be considered in order to describe the effect of determining the step size by taking the difference between adjacent elements.

$$\begin{pmatrix} 1.23 & 2.23 & 1.23 \\ 4.23 & 3.23 & 1.23 \\ 1.23 & 1.23 & 1.23 \end{pmatrix} \quad (4)$$

Like the case of the matrix in expression (2), in the case of expression (4), the minimum value detection unit 121 extracts all elements of the compression target matrix. Then, the minimum value detection unit 121 sorts the extracted elements in ascending order or descending order. When the minimum value detection unit 121 sorts the elements of the QUBO matrix in the example of expression (4) in ascending order, the numerical sequence "1.23, 1.23, 1.23, 1.23, 1.23, 1.23, 2.23, 3.23, 4.23" is acquired as the sort result.

Then, the minimum value detection unit 121 removes duplicate elements from the sort result, and detects the smallest element. In the case of the QUBO matrix shown in expression (4), the minimum value detection unit 121 removes duplicate elements from the sort results above, acquires the numerical sequence "1.23, 2.23, 3.23, 4.23", and detects the smallest element "1.23".

In addition, the step size determination unit 122 takes the difference between adjacent elements in the numerical sequence described above after removal of duplicate elements, and calculates "1, 1, 1, 1". In this case, because the differences are all 1, the QUBO matrix compression unit 120 determines the step size to be 1.

The QUBO matrix compression unit 120 rewrites the compression target matrix into the form shown by expression (1) using the smallest element and the step size obtained in the procedure so far, and then outputs the rewritten matrix. The conversion by the QUBO matrix compression unit 120 from the matrix of real numbers shown in expression (4) to the expression in the form shown in expression (1) is expressed by expression (5).

$$\begin{pmatrix} 1.23 & 2.23 & 1.23 \\ 4.23 & 3.23 & 1.23 \\ 1.23 & 1.23 & 1.23 \end{pmatrix} = -1.23 \times \begin{pmatrix} 1 & 1 & 1 \\ 1 & 1 & 1 \\ 1 & 1 & 1 \end{pmatrix} + 1.0 \times \begin{pmatrix} 0 & 1 & 0 \\ 3 & 2 & 0 \\ 0 & 0 & 0 \end{pmatrix} \quad (5)$$

The elements of the matrix before data compression is performed by the QUBO matrix compression unit 120 have a 0.01 place, as shown on the left side of expression (5). On the other hand, all of the differences between elements are expressed as single-digit numbers, and the real number coefficient representing the step size of the second term on the right side of expression (5) is "1.0".

As described above, the QUBO matrix compression unit 120 may represent "1.0" as a single-digit real number, or as "1" in an integer representation format.

Here, a case will be considered in which the "(step size)" in expression (1) is determined based on the number of digits after the decimal point of the elements of the compression target matrix without calculating the difference between the elements of the real number matrix. In this case, based on the fact that each element of the real number matrix in expression (4) has two digits after the decimal point, the "(step size)" is set to 0.01, and expression (4) can be converted to expression (6).

$$\begin{pmatrix} 1.23 & 2.23 & 1.23 \\ 4.23 & 3.23 & 1.23 \\ 1.23 & 1.23 & 1.23 \end{pmatrix} = -1.23 \times \begin{pmatrix} 1 & 1 & 1 \\ 1 & 1 & 1 \\ 1 & 1 & 1 \end{pmatrix} + 0.01 \times \begin{pmatrix} 0 & 100 & 0 \\ 300 & 200 & 0 \\ 0 & 0 & 0 \end{pmatrix} \quad (6)$$

Like the right side of expression (5), the two matrices on the right side of expression (6) are integer matrices. In this way, the QUBO matrix compression unit 120 generates an expression in the form of expression (1). Therefore, a real number matrix can be expressed by an expression using two integer matrices, and a reduction in the data volume is expected.

On the other hand, the second integer matrix on the right side of expression (6) contains three-digit integers, while the elements of the second integer matrix on the right side of expression (5) are all single-digit integers. In this way, the step size determination unit 122 determines the step size based on the difference between elements, and a reduction in the number of digits of the elements of the second integer matrix can be expected. As a result, a reduction in the data volume is expected.

For example, in the case of a format in which an integer is represented as a binary number using a variable-length bit string, because the number of digits of the elements is small, the data volume required to express the elements is small. Furthermore, in the case of a format in which an integer is represented by 2-byte or 4-byte data, when the step size is calculated based on the number of digits after the decimal point of the elements of the compression target matrix, the effect of reducing the data volume is obtained when an element that is smaller than −32,768 or an element that is larger than 32,767 takes a value within a range of −32,768 to 32,767 when the step size is calculated based on the difference between elements.

Here, the QUBO matrix can generally be expressed as the sum of an upper triangular matrix and a diagonal matrix. Therefore, it can be assumed that the matrix to be handled has elements only in the parts corresponding to an upper triangular matrix and a diagonal matrix. In this case, the QUBO matrix compression unit 120 may generate compressed data in which the representation of the elements of a lower triangular matrix of the second integer matrix is omitted. As a result, the data volume can be reduced.

A device that restores the compressed data generated by the data compression device 100 can restore the second integer matrix by setting each element of the lower triangular matrix of the second integer matrix to 0.

Furthermore, when a problem subjected to data compression is explicitly expressed using a plurality of matrices, and the place expressed by the elements is different for each matrix, the QUBO matrix compression unit 120 may perform the compression operation using a different step size for each matrix, and each of the plurality of matrices may be expressed in the form of expression (1).

For example, a case will be considered in which the QUBO matrix represented by the left side of expression (7) is expressed as the right side of expression (7).

$$\begin{pmatrix} -9.98 & -20.08 & 39.9 \\ 0.0 & -9.77 & 19.96 \\ 0.0 & 0.0 & -39.84 \end{pmatrix} = \quad (7)$$

$$\begin{pmatrix} -10 & -20 & 40 \\ 0 & -10 & 20 \\ 0 & 0 & -40 \end{pmatrix} + \begin{pmatrix} 0.02 & -0.08 & -0.1 \\ 0 & 0.23 & -0.04 \\ 0 & 0 & 0.16 \end{pmatrix}$$

Of the two matrices on the right side of expression (7), the matrix on the left side (the side closer to "=") can be expressed by an integer matrix. The matrix on the right side (trailing side) can be expressed by a real number matrix. The QUBO matrix input unit 110 or the QUBO matrix compression unit 120 may convert the QUBO matrix illustrated on the left side of expression (7) into the plurality of matrices illustrated on the right side of expression (7). Alternatively, the QUBO matrix input unit 110 may acquire the plurality of matrices illustrated on the right side of expression (7) from outside the data compression device 100.

When the matrix on the left side of expression (7) is expressed in the form of expression (1), it is expressed as shown on the right side of expression (8).

$$\begin{pmatrix} -9.98 & -20.08 & 39.9 \\ 0.0 & -9.77 & 19.96 \\ 0.0 & 0.0 & -39.84 \end{pmatrix} = \quad (8)$$

$$-20.08 \times \begin{pmatrix} 1 & 1 & 1 \\ 1 & 1 & 1 \\ 1 & 1 & 1 \end{pmatrix} + 0.001 \times \begin{pmatrix} 1010 & 0 & 5998 \\ 2008 & 1031 & 4004 \\ 2880 & 2008 & -1976 \end{pmatrix}$$

On the other hand, when the matrix on the left side of the right side of expression (7) is expressed in the form of expression (1), it is expressed as shown on the right side of expression (9).

$$\begin{pmatrix} -10 & -20 & 40 \\ 0 & -10 & 20 \\ 0 & 0 & -40 \end{pmatrix} = -40 \times \begin{pmatrix} 1 & 1 & 1 \\ 1 & 1 & 1 \\ 1 & 1 & 1 \end{pmatrix} + 10 \times \begin{pmatrix} 3 & 2 & 8 \\ 4 & 3 & 6 \\ 4 & 4 & 0 \end{pmatrix} \quad (9)$$

Furthermore, when the matrix on the right side of the right side of expression (7) is expressed in the form of expression (1), it is expressed as shown on the right side of expression (10).

$$\begin{pmatrix} 0.02 & -0.08 & -0.1 \\ 0 & 0.23 & -0.04 \\ 0 & 0 & 0.16 \end{pmatrix} = -0.1 \times \begin{pmatrix} 1 & 1 & 1 \\ 1 & 1 & 1 \\ 1 & 1 & 1 \end{pmatrix} + 0.01 \times \begin{pmatrix} 12 & 2 & 0 \\ 10 & 33 & 6 \\ 10 & 10 & 26 \end{pmatrix} \quad (10)$$

In expression (9), the step size is 10. In contrast, in expression (10), the step size is 0.01.

Here, a case will be considered in which the QUBO matrix compression unit 120 expresses the second integer matrix in expression (1) as a variable-length bit string using a binary one's complement representation of the binary numbers, and sets the first bit to "0" when the value of the element is positive.

In the example of expression (8), each element other than "0" in the second integer matrix is expressed by a bit string from 11 bits to 14 bits. On the other hand, in the example of expression (9), each element in the second integer matrix is expressed by a bit string of at most 5 bits. Furthermore, in the example of expression (10), of the elements of the second integer matrix, "33" is represented by a 7-bit string, "26" is represented by a 6-bit string, and the other elements are represented by a bit string of at most 5 bits.

In this way, when the problem subjected to data compression is expressed using a plurality of matrices, the QUBO matrix compression unit 120 is capable of setting the step size for each matrix. As a result, the required memory volume can be smaller in some cases when the problem is expressed using a plurality of matrices and each matrix is expressed in the form of expression (1), than when the problem is expressed using a single matrix and the matrix is expressed in the form of expression (1). In this respect, it is expected that the memory volume can be reduced.

Here, an example of expressing a problem using a plurality of matrices includes, in addition to a case where the QUBO matrix is expressed as the sum of a plurality of matrices, a case where one or both of a plurality of constraints and objective functions exist in a combinatorial optimization problem. In this case, all constraints and all objective functions may be represented by a single matrix. Alternatively, a matrix may be provided for each constraint and each objective function in order to express the constraint or objective function.

The QUBO matrix transmission unit 130 transmits compressed data from the QUBO matrix compression unit 120 to an Ising calculator, which is an input destination of the QUBO matrix. Alternatively, when the compression target matrix is used for simulated annealing, the QUBO matrix transmission unit 130 may transmit the compressed data from the QUBO matrix compression unit 120 to a calculator that executes simulated annealing.

As a result of the QUBO matrix compression unit 120 compressing the data, the data volume transmitted by the QUBO matrix transmission unit 130 can be made relatively small.

However, the method by which the data compression device 100 outputs the compressed data is not limited to a method of transmitting the data to an input destination device. For example, the data compression device 100 may write the compressed data to an external storage device. In this case, the user may connect the storage device to a device at the data input destination, and input the compressed data to the device.

Next, the processing procedure by which the data compression device 100 compresses QUBO matrix data will be described with reference to FIG. 2.

Figure 2:
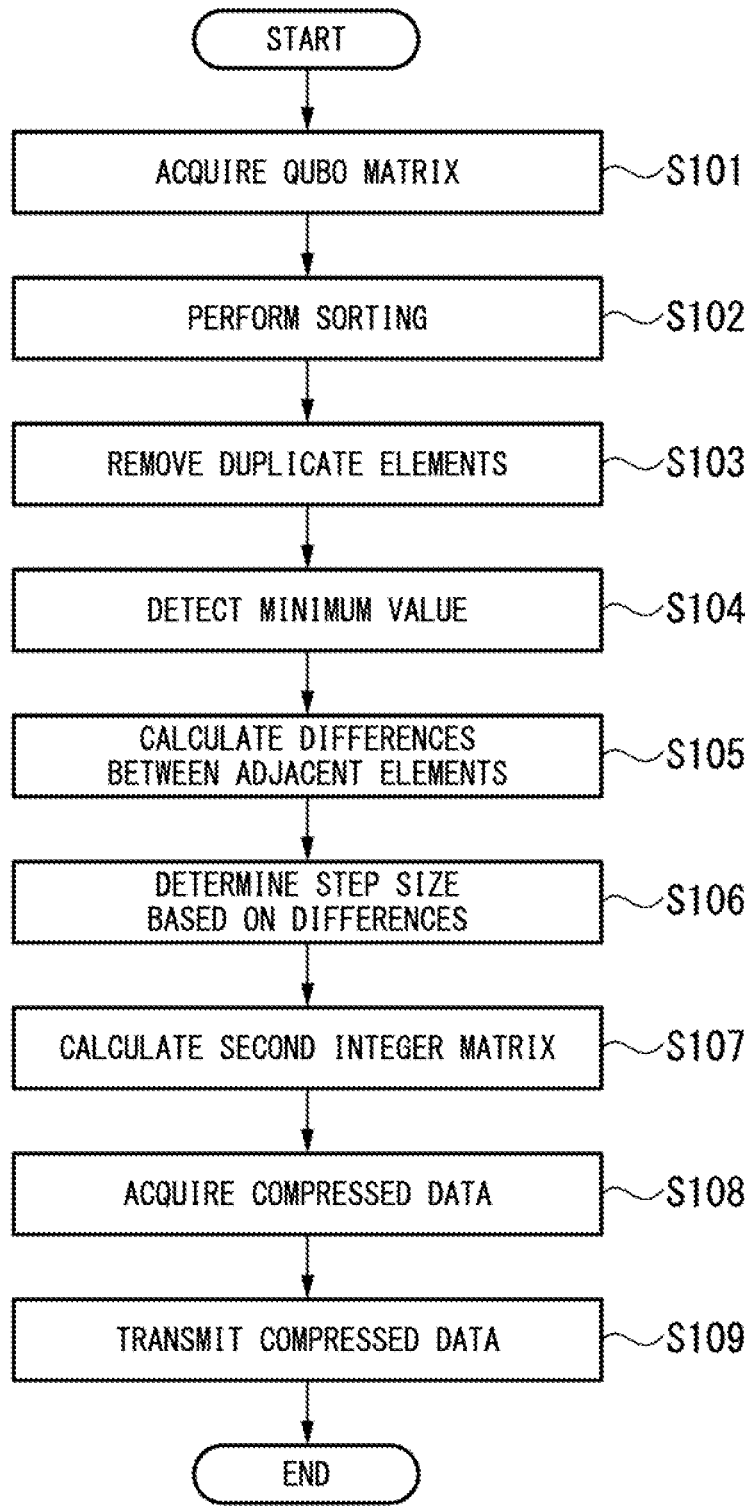
FIG. 2 is a diagram showing an example of the processing procedure by which a data compression device according to some example embodiments of the present disclosure compresses QUBO matrix data.

FIG. 2 is a diagram showing an example of the processing procedure by which the data compression device 100 compresses QUBO matrix data.

In the processing of FIG. 2, the QUBO matrix input unit 110 acquires a QUBO matrix having real numbers as elements (step S101).

Then, the minimum value detection unit 121 extracts the elements of the QUBO matrix, and rearranges the extracted elements by sorting them in ascending order (step S102). At this time, the minimum value detection unit 121 may perform sorting in descending order instead of sorting in ascending order.

Then, the minimum value detection unit 121 removes duplicate elements from the numerical sequence obtained as the sort result (step S103).

Next, the minimum value detection unit 121 detects the minimum value of the numerical sequence after removal of duplicates (step S104). Furthermore, the step size determination unit 122 calculates the differences between adjacent elements in the numerical sequence after removal of duplicates (step S105). Then, the step size determination unit 122 searches for the smallest place required to express the obtained differences, and determines the step size (step S106).

Next, the integer calculation unit 123 calculates differences obtained by subtracting the minimum value detected by the minimum value detection unit 121 in step S104 from each element of the QUBO matrix acquired by the QUBO matrix input unit 110 in step S101, and then generates a second integer matrix by dividing each element obtained after subtraction of the minimum value by the step size (step S107).

Then, the QUBO matrix compression unit 120 uses the minimum value obtained in step S104, the step size obtained in step S106, and the second integer matrix obtained in step S107 to rewrite the QUBO matrix acquired by the QUBO matrix input unit 110 in step S101 in the form shown in expression (1) (step S108). As a result, the QUBO matrix compression unit 120 acquires the data obtained by data compression of the QUBO matrix.

The QUBO matrix transmission unit 130 transmits the compressed data to the device at the input destination of the QUBO matrix (step S109).

After step S109, the data compression device 100 ends the processing of FIG. 2.

As described above, the data that is subjected to compression by the data compression device 100 is not limited to data representing a QUBO matrix, and can be a variety of data containing a plurality of real numbers. For example, the data compression device 100 is not limited to compressing a QUBO matrix, and may compress various data in which all the elements contained in the matrix have a relatively small number of significant digits, such as at most three digits, and is data that is expressed using a real number matrix in which the order of all the elements is approximately the same.

The order referred to here represents the places in which the significant figures are located. For example, when a certain number is expressed as a fixed point decimal number, the largest place represented by a non-zero number is referred to as the order of the number. For example, when the largest place represented by a non-zero number in a certain number is the tens place, the order of the number is referred to as order 10.

The field targeted for data compression by the data compression device 100 is also not limited to a specific field. FIG. 3 is a diagram showing a first example of data in the education field that is subjected to compression by the data compression device 100. In the example of FIG. 3, the scoring rate for each test question for students at a certain school is shown as tabular data. The data shown in FIG. 3 can be represented by the matrix shown in expression (11).

$$\begin{pmatrix} 66.6 & 100.0 & \cdots & 33.3 \\ 100.0 & 75.0 & \cdots & 50.0 \\ \vdots & \vdots & \ddots & \vdots \\ 50.0 & 50.0 & \cdots & 100.0 \end{pmatrix} \quad (11)$$

In the example of FIG. 3, the number of questions and the number of students do not need to be the same. Therefore, the matrix shown in expression (11) does not need to be a square matrix.

In the matrix shown in expression (11), the significant figures of the elements exist at most the first decimal place. The number of significant digits of each element is at most four digits, and the order is order 10 or 100. In this way, because the data shown in expression (11) is data in which the elements of the matrix have a relatively small number of significant digits, and the order of all elements is at the same level, it is expected that the effect of data compression by the data compression device 100 can be obtained.

FIG. 4 is a diagram showing a second example of data in the education field that is subjected to compression by the data compression device 100. In the example of FIG. 4, the deviation values for each subject of student tests in a certain school are shown as tabular data. The data shown in FIG. 4 can be represented by the matrix shown in expression (12).

$$\begin{pmatrix} 51.2 & 58.9 & \cdots & 46.7 \\ 52.3 & 56.7 & \cdots & 47.8 \\ \vdots & \vdots & \ddots & \vdots \\ 53.4 & 57.8 & \cdots & 45.6 \end{pmatrix} \quad (12)$$

In the example of FIG. 4, the number of subjects and the number of students do not need to be the same. Therefore, the matrix shown in expression (12) does not need to be a square matrix.

In the matrix shown in expression (12), the significant figures of the elements exist at most the first decimal place. Furthermore, the deviation values are generally real numbers from approximately 20 or 30 to approximately 70 or 80 with an average of 50, and the order of the deviation values is generally order 10. In the example of expression (12), the number of significant digits of each element is three digits, and the order is order 10. In this way, because the data shown in expression (12) is data in which the elements of the matrix have a relatively small number of significant digits, and the order of all elements is at the same level, it is expected that the effect of data compression by the data compression device 100 can be obtained.

FIG. 5 is a diagram showing an example of data in the chemical field that is subjected to compression by the data compression device 100. In the example of FIG. 5, the components of each of a plurality of aqueous solution samples are shown as tabular data. The data shown in FIG. 5 can be represented by the matrix shown in expression (13).

$$\begin{pmatrix} 12.3 & 13.4 & \cdots & 14.5 \\ 36.7 & 35.6 & \cdots & 34.5 \\ \vdots & \vdots & \ddots & \vdots \\ 23.4 & 25.6 & \cdots & 24.5 \end{pmatrix} \quad (13)$$

In the matrix shown in expression (13), the significant figures of the elements exist at most the first decimal place. The number of significant digits of each element is at most three digits, and the order is order 10. In this way, because the data shown in expression (13) is data in which the elements of the matrix have a relatively small number of significant digits, and the order of all elements is at the same level, it is expected that the effect of data compression by the data compression device 100 can be obtained.

The component data as shown in the example of FIG. 5 and expression (13) also appears in the results of blood tests in health checkups. In this way, data in the healthcare field can also be subjected to compression by the data compression device 100.

Furthermore, even when the data has a different order for each element, the effect of data compression by the data compression device 100 can sometimes be obtained by matching the orders.

FIG. 6 is a diagram showing an example of data in which the order is different for each element. In the example of FIG. 6, the components of each of a plurality of aqueous solution samples are shown as tabular data. Furthermore, in the example of FIG. 6, the order is different for each element. For example, the order of the element of component 1 for each sample is order 10, while the order of the element of component 2 is order 0.01.

FIG. 7 is a diagram showing an example of data in which the orders have been matched. FIG. 7 shows an example in which the orders of the elements of the data shown in FIG. 6 have been matched.

In the example of FIG. 7, by changing the unit of the element of component 2 of each sample from mg (milligrams) to µg (micrograms), the order becomes order 10. The data shown in FIG. 7 can be expressed by the matrix shown in expression (13) above, and like the case of FIG. 5, it is expected that the effect of data compression by the data compression device 100 can be obtained.

When representing data in which the units differ depending on the element as in the example of FIG. 7, the use of data representing the value of each element in a data-compressed format and data representing the units of each element can be considered. In the case of the example of FIG. 7, it is possible to represent in advance the unit "mg/L" by the bit value "0", and the unit "µg/L" by the bit value "1". Further, the data compression device 100 may generate a bit sequence of n bits indicating whether the units of each element is mg/L or "µg/L". Here, n is an integer indicating the number of components in the example of FIG. 7.

As described above, the step size determination unit 122 determines, based on the significant figures of each of a plurality of real numbers, a step size that is a value capable of dividing without remainder each of the plurality of real numbers. The integer calculation unit 123 calculates integers by dividing each of the plurality of real numbers by the step size.

According to the data compression device 100, the plurality of real numbers can be expressed by integers corresponding to each of the plurality of real numbers, and a single real number that expresses the step size. Therefore, the number of real numbers used to express the data can be reduced. According to the data compression device 100, in this respect, it is expected that the data volume required to represent a plurality of real numbers can be made relatively small.

In particular, when the data volume required to express an integer is smaller than the data volume required to express a real number, the effect of reducing the data volume (effect of the data compression) by the data compression device 100 can be anticipated. When the number of real numbers contained in the data of the data compression target is large, it is expected that the effect of reducing the data volume by the data compression device 100 will be large.

According to the data compression device 100, because the data volume required to express the data is small, it is expected that the time required to transmit the data will be short.

Furthermore, according to the data generated by the data compression device 100, the original real numbers can be reproduced based on the integers and the step size that are represented by the data. In this way, according to the data compression device 100, it is possible to reversibly compress the data.

Furthermore, the data compression device 100 is capable of compressing data with relatively simple processing. For this reason, an implementation in which the data compression device 100 is installed in a personal computer (PC) of a user can be considered. For example, if the user wants to prevent know-how relating to the creation method of a QUBO model from being leaked, the data volume expressing the QUBO matrix can be reduced without the need to transmit the QUBO matrix to the cloud.

The user is capable of encrypting the QUBO matrix that has been expressed with a reduced data volume and then transmitting it to an Ising calculator, and it is expected that the volume of the encrypted data will be smaller than when the QUBO matrix is encrypted as is using a representation format in which the data volume is not reduced.

According to the data compression device 100, in this respect, it is possible to prevent know-how relating to the creation method of a QUBO model from being leaked, while also shortening the transmission time of the QUBO matrix to the Ising calculator.

Furthermore, the QUBO matrix input unit 110 acquires data containing a plurality of real numbers. The minimum value detection unit 121 detects the minimum value among the plurality of real numbers contained in the data acquired by the QUBO matrix input unit 110. The integer calculation unit 123 calculates integers by dividing, by the step size, each of the values obtained by subtracting the minimum value detected by the minimum value detection unit 121 from each of the plurality of real numbers contained in the data acquired by the QUBO matrix input unit 110.

In this way, because the integer calculation unit 123 calculates integers using values in which the minimum value has been subtracted from each of the plurality of real numbers, the obtained integers are positive integers or 0, and a bit for expressing the sign becomes unnecessary. According to the data compression device 100, it is expected that the effect of data compression will be even larger in this respect.

Furthermore, because the integer calculation unit 123 calculates integers using values in which the minimum value has been subtracted from each of the plurality of real numbers, the number of digits of the calculated integers can in some cases be smaller than when the plurality of real numbers are used as is when calculating the integers. In this case, it is expected that the effect of data compression by the data compression device 100 will be even larger.

Moreover, the minimum value detection unit 121 sorts the plurality of real numbers included in the data acquired by the QUBO matrix input unit 110, removes the duplicate real numbers from the sort result, and detects the minimum value represented by the sort result after removal of duplicates. The step size determination unit 122 calculates the differences between adjacent real numbers in the sort result after removal of duplicates, and determines the step size based on the calculated differences.

In this way, because the step size determination unit 122 determines the step size based on the differences between adjacent real numbers in the sort result of the plurality of real numbers, the step size can in some cases become larger (the place expressed by the step size for non-zero numbers becomes larger) than when the step size is determined based on the plurality of real numbers themselves. As a result of the step size becoming larger, it is expected that the order of the integers calculated by the integer calculation unit 123 will become relatively small. In this respect, it is expected that the effect of data compression by the data compression device 100 will become larger.

Furthermore, the step size determination unit 122 can determine the step size using the result of the sort performed by the minimum value detection unit 121 for determining the minimum value. According to the data compression device 100, the processing load is relatively light in the respect that it is not necessary for the step size determination unit 122 to perform a separate sort for determining the step size.

Furthermore, the plurality of real numbers acquired by the QUBO matrix input unit 110 are elements of a matrix in which all elements are expressed in decimal notation and as floating point numbers with three significant figures or less.

In this way, because the digit number of significant figures of the plurality of real numbers acquired by the QUBO matrix input unit 110 is relatively small, it is expected that the effect of data compression by the data compression device 100 can be easily obtained.

Moreover, among the elements of the matrix acquired by the QUBO matrix input unit 110, the places in which the significant figures of all non-zero elements appear are the same. In this way, because the places of the significant figures of each element are matched, it is expected that the number of digits of the integers calculated by the integer calculation unit 123 will be relatively small. According to the data compression device 100, it is expected that the effect of data compression will be even larger in this respect. Furthermore, the matrix acquired by the QUBO matrix input unit 110 is a QUBO matrix.

The digits of significant figures in the real number values of the elements of the QUBO matrix are approximately two or three, and the order of each element often does not change much. Here, the order of an element not changing much refers to, for example, a state where the absolute values of the non-zero components of the QUBO matrix are approximately 1 to 10, or approximately 0.1 to 1, and refers to the fact that the non-zero elements of the QUBO matrix do not contain a mixture of elements with different orders such as elements of approximately 0.01, elements of approximately 1, and elements of approximately 100.

The QUBO matrix can be said to be a matrix in which the effect of data compression by the data compression device 100 can be obtained relatively easily. As a result of the QUBO matrix input unit 110 acquiring a QUBO matrix, it is expected that the effect of data compression by the data compression device 100 will be obtained relatively easily.

Furthermore, the step size determination unit 122 determines a different step size for each matrix when a single problem is expressed using a plurality of matrices, and the places of the significant figure are different for each matrix.

As a result, in the data compression device 200, the required memory volume is considered to be smaller than in a case where the problem is expressed using a single matrix. In this respect, it is expected that the memory volume can be reduced.

In some example embodiments of the present disclosure, a case will be described where a data compression device compresses a QUBO matrix, which is the compression target matrix, after conversion according to the characteristics of an Ising calculator.

Figure 8:
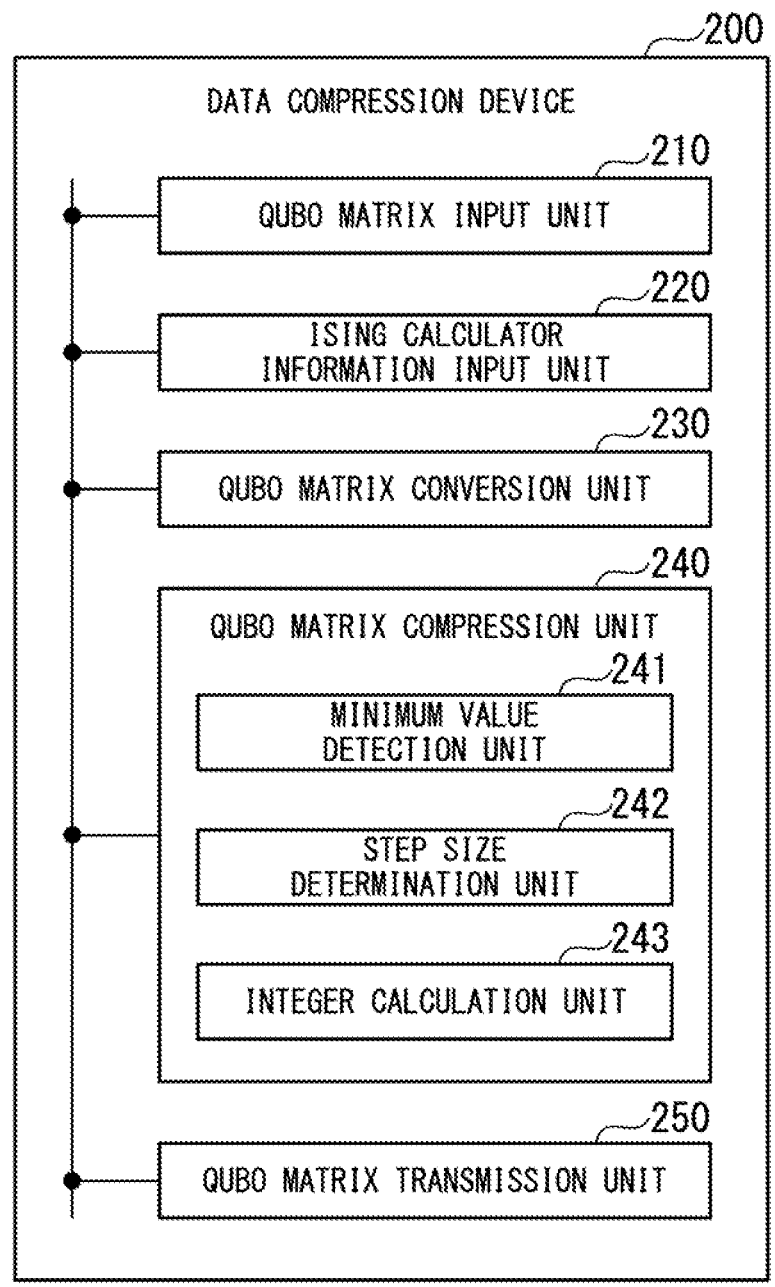
FIG. 8 is a diagram showing an example of a configuration of a data compression device according to some example embodiments of the present disclosure.

FIG. 8 is a diagram showing an example of a configuration of a data compression device 200 according to some example embodiments of the present disclosure. The data compression device 200 includes a QUBO matrix input unit 210, an Ising calculator information input unit 220, a QUBO matrix conversion unit 230, a QUBO matrix compression unit 240, and a QUBO matrix transmission unit 250. The QUBO matrix compression unit 240 includes a minimum value detection unit 241, a step size determination unit 242, and an integer calculation unit 243.

The QUBO matrix input unit 210 is the same as the QUBO matrix input unit 110 in FIG. 1. Therefore, a detailed description is omitted here. The QUBO matrix compression unit 240 and the units thereof are the same as the QUBO matrix input unit 120 in FIG. 1 and the units thereof. Therefore, a detailed description is omitted here. The QUBO matrix transmission unit 250 is the same as the QUBO matrix transmission unit 130 in FIG. 1. Therefore, a detailed description is omitted here.

The configuration of the data compression device 200 is a configuration in which an Ising calculator information input unit 220 and a QUBO matrix conversion unit 230 have been added to the configuration of the data compression device 100 shown in FIG. 1. The data compression device 200 is the same as the data compression device 100 in all other respects.

The Ising calculator information input unit 220 acquires information about an Ising calculator at an input destination of the QUBO matrix, which is the compression target matrix.

For example, the Ising calculator information input unit 220 may acquire some or all of a machine name, a model number, and an IP address that are capable of identifying the Ising calculator at the input destination of the QUBO matrix. In this case, the data compression device 200 may store in advance, for each Ising calculator, information indicating the characteristics of the Ising calculator in association with the information capable of identifying the Ising calculator.

Alternatively, the Ising calculator information input unit 220 may acquire information indicating the characteristics of the Ising calculator at the input destination of the QUBO matrix. For example, the Ising calculator information input unit 220 may perform communication with the Ising calculator at the input destination of the QUBO matrix, and receive information indicating the characteristics of the Ising calculator.

The QUBO matrix conversion unit 230 converts the QUBO matrix, which is the compression target matrix, into a QUBO matrix that is easily handled by the Ising calculator at the input destination in a range that does not change the meaning of the combinatorial optimization problem expressed by the QUBO matrix. For example, the QUBO matrix conversion unit 230 performs a scaling operation of multiplying all elements of the QUBO matrix by a constant.

The QUBO matrix conversion unit 230 corresponds to an example of a data conversion means.

Here, a QUBO matrix that is easily handled by an Ising calculator at the input destination may be a QUBO matrix in which the number of bits required to express the elements of the QUBO matrix is in a range that can be handled as is by the Ising calculator. Alternatively, a QUBO matrix that is easily handled by an Ising calculator at the input destination may be a QUBO matrix in which the range of elements of the QUBO matrix fall within a specific numerical range. Alternatively, a QUBO matrix that is easily handled by an Ising calculator at the input destination may be a QUBO matrix in which the differences between the elements of the QUBO matrix are within a specific numerical range.

First, a case where the data compression device 200 converts the QUBO matrix, which is the compression target matrix, into a QUBO matrix in which the number of bits required to express the elements of the QUBO matrix is within a range that can be handled as is by an Ising calculator will be described using an example.

The elements of a QUBO matrix that can be input to an Ising computer such as a quantum annealing machine are not arbitrary real numbers, and the gradations that can be handled by each Ising calculator may be determined in advance. For example, a case where each element is expressed in binary will be considered for a QUBO matrix such as that shown in expression (14), which has integer elements from −32 to +32.

$$\begin{pmatrix} -8 & -16 & 32 \\ 0 & -8 & 16 \\ 0 & 0 & -32 \end{pmatrix} \quad (14)$$

Furthermore, it is assumed here that each element of the QUBO matrix is expressed by a bit string that is a combination of a 1-bit sign bit and a bit string expressing a binary number.

In the case of the QUBO matrix shown in expression (14), for example, 7 bits are required in order to express the element "−32" as shown in expression (15).

$$-32 = (-1)^1 (2^0 \cdot 0 + 2^1 \cdot 0 + 2^2 \cdot 0 + 2^3 \cdot 0 + 2^4 \cdot 0 + 2^5 \cdot 1) \quad (15)$$

On the other hand, when the elements that can be handled by an Ising calculator are up to 5-bit binary numbers, it is not possible to input a QUBO matrix that requires 7 bits to express the elements such as in the example of expression (14).

Here, it is assumed that even if all matrix elements of the QUBO matrix shown in expression (14) are divided by 8, that is, 23, the meaning of the original combinatorial optimization problem will not change. Therefore, when the QUBO matrix conversion unit 230 performs a conversion of dividing the QUBO matrix shown in expression (14) by 23, it can be converted into the QUBO matrix shown in expression (16).

$$\begin{pmatrix} -1 & -2 & 4 \\ 0 & -1 & 2 \\ 0 & 0 & -4 \end{pmatrix} \quad (16)$$

The transformed QUBO matrix shown in expression (16) has integer elements from −4 to +4. When each element of the QUBO matrix shown in expression (16) is represented by a bit string that is a combination of a 1-bit sign bit and a bit string expressing a binary number as described above, each element can be represented with 4 bits or less. For example, the element "−4" can be represented by 4 bits as shown in expression (17).

$$-4 = (-1)^1 (2^0 \cdot 0 + 2^1 \cdot 0 + 2^2 \cdot 1) \quad (17)$$

Therefore, the QUBO matrix shown in expression (16) can be input to an Ising calculator that can handle elements of up to 5 binary bits. In this way, as a result of the QUBO matrix conversion unit 230 performing a scaling operation in a range that does not change the meaning of the original combinatorial optimization problem, the QUBO matrix that could not be input to the Ising calculator can sometimes be converted such that it can be input to the Ising calculator.

Next, a case where the data compression device 200 converts a QUBO matrix, which is the compression target matrix, into a QUBO matrix in which the range of elements falls within a specific numerical range will be described using an example.

In the following description, it is assumed that the Ising calculator has a characteristic in which a high performance is exhibited when the QUBO matrix falls within a specific numerical range.

For example, it is assumed that it is known that a certain Ising calculator exhibits a high performance if the values of the elements of the input QUBO matrix are in the range of approximately −20 to +20. A case is considered where the QUBO matrix shown in expression (18) is input to such an Ising calculator.

$$\begin{pmatrix} -7.98 \times 10^5 & -2 \times 10^6 & 5 \times 10^5 \\ 0 & -8 \times 10^5 & 4.96 \times 10^5 \\ 0 & 0 & 1.203 \times 10^6 \end{pmatrix} \quad (18)$$

The order of the elements of the QUBO matrix shown in expression (18) is order $10^6$. For this reason, if the QUBO matrix shown in expression (18) is directly input into the Ising calculator, a high performance cannot be obtained. Therefore, when the QUBO matrix conversion unit 230 performs a scaling operation that divides each element of the QUBO matrix shown in expression (18) by $10^5$ such that the elements of the matrix are contained in a range of −20 to +20, the QUBO matrix can be converted to the QUBO matrix shown in expression (19).

$$\begin{pmatrix} -7.98 & -20 & 5 \\ 0 & -8 & 4.96 \\ 0 & 0 & 12.03 \end{pmatrix} \quad (19)$$

The elements of the QUBO matrix shown in expression (19) are contained in a range of −20 to +20. Therefore, it is expected that a high performance will be obtained when the QUBO matrix is input to the Ising calculator. In this way, as a result of the QUBO matrix conversion unit 230 performing a scaling operation in a range that does not change the meaning of the original combinatorial optimization problem, it is expected that it will be possible in some cases to obtain the high performance of an Ising calculator.

Next, a case where the data compression device 200 converts a QUBO matrix, which is the compression target matrix, into a QUBO matrix in which the differences between the elements of the QUBO matrix is in a specific numerical range will be described using an example.

In the following description, it is assumed that the Ising calculator has a characteristic in which a high performance is exhibited when the differences between the elements of the QUBO matrix is in a specific numerical range.

For example, it is assumed that it is known that a certain Ising calculator exhibits a high performance if the differences between the elements of the input QUBO matrix are 0.1 or more. A case is considered where the QUBO matrix shown in expression (19) above is input to such an Ising calculator.

The minimum value of the differences between the elements of the QUBO matrix shown in expression (19) is 0.02. Therefore, a high performance cannot be obtained when the QUBO matrix is input as is to the Ising calculator. Therefore, when the QUBO matrix conversion unit 230 performs a scaling operation that multiplies each element of the QUBO matrix shown in expression (19) by 5 such that the differences between the elements of the QUBO matrix are 0.1 or more, the QUBO matrix can be converted to the QUBO matrix shown in expression (20).

$$\begin{pmatrix} -39.9 & -10 & 25 \\ 0 & -40 & 24.8 \\ 0 & 0 & 60.15 \end{pmatrix} \quad (20)$$

The differences between the elements of the QUBO matrix shown in expression (20) are 0.1 or more. Therefore, it is expected that a high performance will be obtained when the QUBO matrix is input to the Ising calculator. In this way, as a result of the QUBO matrix conversion unit 230 performing a scaling operation in a range that does not change the meaning of the original combinatorial optimization problem, it is expected that it will be possible in some cases to obtain the high performance of an Ising calculator.

Figure 9:
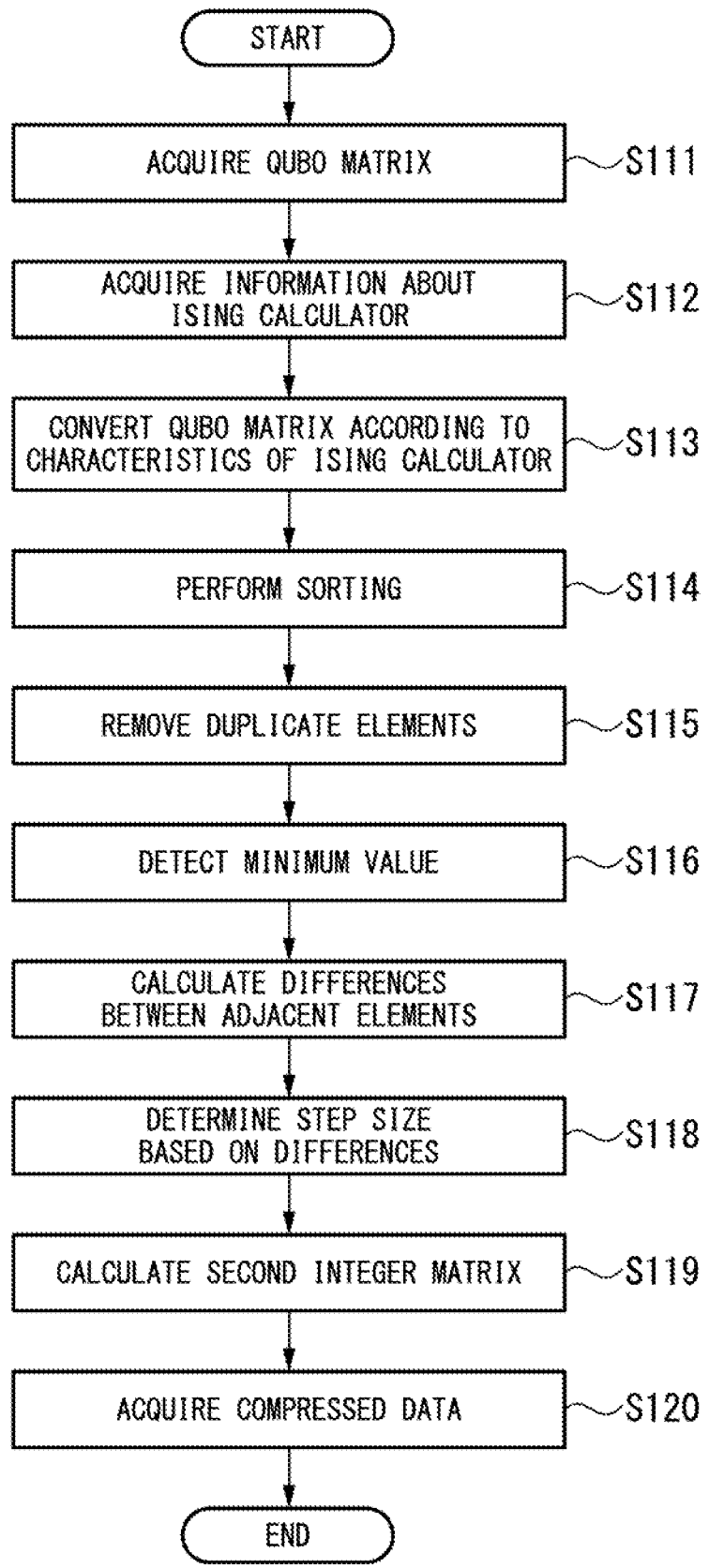
FIG. 9 is a diagram showing an example of the processing procedure performed by a data compression device according to some example embodiments of the present disclosure.

Next, the processing procedure performed by the data compression device 200 will be described with reference to FIG. 9. FIG. 9 is a diagram showing an example of the processing sequence performed by the data compression device 200.

In the processing of FIG. 9, the QUBO matrix input unit 210 acquires a QUBO matrix having real numbers as elements (step S111). Step S111 is the same as step S101 in FIG. 2.

Then, the Ising calculator information input unit 220 acquires information about an Ising calculator at an input destination of the QUBO matrix (step S112).

For example, the Ising calculator information input unit 220 may be capable of acquiring information about the number of bits used to express the elements of the QUBO matrix that can be handled by the Ising calculator at the input destination of the QUBO matrix. Alternatively, the Ising calculator information input unit 220 may acquire information about the range of values of the elements of the QUBO matrix that enables the Ising calculator at the input destination of the QUBO matrix mentioned above to exhibit a high performance. Alternatively, the Ising calculator information input unit 220 may acquire information about the differences between the elements of the QUBO matrix that enables the Ising calculator at the input destination of the QUBO matrix mentioned above to exhibit a high performance. Alternatively, the Ising calculator information input unit 220 may acquire a combination of the information above.

Next, the QUBO matrix conversion unit 230 converts the QUBO matrix obtained in step S111 based on information about the Ising calculator obtained in step S112 (step S113). As mentioned above, the QUBO matrix conversion unit 230 converts the QUBO matrix such that it becomes a QUBO matrix that is easily handled by the Ising calculator at the input destination of the QUBO matrix. For example, as described above, the QUBO matrix conversion unit 230 divides each element of the QUBO matrix by the same value, or performs a scaling operation that multiplies each element by the same value.

Steps S114 to S120 described below are the same as steps S102 to S108 in FIG. 2.

After step S113, the minimum value detection unit 241 extracts the elements of the converted QUBO matrix obtained in step S113, and rearranges the extracted elements by sorting them in ascending order (step S114). At this time, the minimum value detection unit 241 may perform sorting in descending order instead of sorting in ascending order.

Then, the minimum value detection unit 241 removes duplicate elements from the numerical sequence obtained as the sort result (step S115).

Next, the minimum value detection unit 241 detects the minimum value of the numerical sequence after removal of duplicates (step S116). Furthermore, the step size determination unit 242 calculates the differences between adjacent elements in the numerical sequence after removal of duplicates (step S117). Then, the step size determination unit 242 searches for the smallest place (position) required to express the obtained differences, and determines the step size (step S118).

Next, the integer calculation unit 243 calculates differences in which the minimum value detected by the minimum value detection unit 241 in step S116 is subtracted from each element of the QUBO matrix acquired by the QUBO matrix input unit 210 in step S111, and then generates a second integer matrix by dividing each element obtained after subtraction of the minimum value by the step size (step S119).

Then, the QUBO matrix compression unit 240 uses the minimum value obtained in step S116, the step size obtained in step S118, and the second integer matrix obtained in step S119 to rewrite the QUBO matrix acquired by the QUBO matrix input unit 210 in step S111 in the form shown in expression (1) (step S120). As a result, the QUBO matrix compression unit 240 acquires the data obtained by data compression of the QUBO matrix.

The QUBO matrix transmission unit 250 transmits the compressed data to a device at the input destination of the QUBO matrix (step S121).

After step S121, the data compression device 200 ends the processing of FIG. 9.

In the processing of step S113, when a QUBO matrix is obtained in which all elements are expressed by an integer, the data compression device 200 may omit the data compression processing with respect to the QUBO matrix. Specifically, the QUBO matrix compression unit 240 may not perform the processing from steps S114 to S120.

In this case, in step S121, the QUBO matrix transmission unit 250 may transmit the data representing the QUBO matrix after conversion in step S113 as is (without data compression by the QUBO matrix compression unit 240) to the device at the input destination of the QUBO matrix.

As described above, the QUBO matrix conversion unit 230 changes the values of the elements of the QUBO matrix such that the values of the elements of the QUBO matrix acquired by the QUBO matrix input unit 210 satisfy a condition that is set in advance according to a characteristic of a quantum computer using the QUBO matrix.

As a result, in the data compression device 200, an effect is expected in which a quantum computer that could not be used with the QUBO matrix before conversion can now be used, or a quantum computer exhibits a higher performance than when the QUBO matrix before conversion is applied to a quantum computer.

Furthermore, the QUBO matrix conversion unit 230 changes the values of the elements of the QUBO matrix such that the values of the elements of the QUBO matrix acquired by the QUBO matrix input unit 210 are expressed within a number of bits that is set in advance according to a characteristic of a quantum computer using the QUBO matrix.

As a result, in the data compression device 200, an effect is expected in which a quantum computer that could not be used with the QUBO matrix before conversion due to a condition for the number of bits that can be handled by the quantum computer not being met can now be used.

Furthermore, the QUBO matrix conversion unit 230 changes the values of the elements of the QUBO matrix such that the values of the elements of the QUBO matrix acquired by the QUBO matrix input unit 210 are contained in a range that is set in advance according to a characteristic of a quantum computer using the QUBO matrix.

As a result, in the data compression device 200, an effect is expected in which a quantum computer exhibits a higher performance than when the QUBO matrix before conversion is applied to a quantum computer.

In addition, the QUBO matrix conversion unit 230 performs scaling, being processing that divides each element of the QUBO matrix by the same value or multiplies each element by the same value, such that the values of the elements of the QUBO matrix acquired by the QUBO matrix input unit 210 are contained in a range that is set in advance according to a characteristic of a quantum computer that uses the QUBO matrix.

As a result, in the data compression device 200, an effect is expected in which relatively simple processing such as dividing each element of the QUBO matrix by the same value or multiplying each value by the same value will enable a quantum computer to exhibit higher performance than when the QUBO matrix before conversion is applied to a quantum computer.

Figure 10:
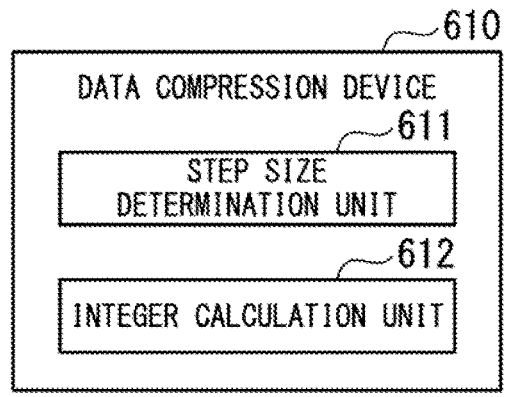
FIG. 10 is a diagram showing an example of a configuration of a data compression device according to some example embodiments of the present disclosure.

FIG. 10 is a diagram showing an example of a configuration of a data compression device according to some example embodiments of the present disclosure. In the configuration shown in FIG. 10, the data compression device 610 includes a step size determination unit 611 and an integer calculation unit 612.

In this configuration, the step size determination unit 611 determines, based on the significant figures of each of a plurality of real numbers, a step size that is a value capable of dividing without remainder each of the plurality of real numbers. The integer calculation unit 612 calculates integers by dividing each of the plurality of real numbers by the step size.

The step size determination unit 611 corresponds to an example of a step size determination means. The integer calculation unit 612 corresponds to an example of an integer calculation means.

According to the data compression device 610, the plurality of real numbers can be expressed by integers corresponding to each of the plurality of real numbers, and a single real number that expresses the step size. Therefore, the number of real numbers used to express the data can be reduced. According to the data compression device 610, in this respect, it is expected that the data volume required to represent a plurality of real numbers can be made relatively small.

In particular, when the data volume required to express an integer is smaller than the data volume required to express a real number, the effect of reducing the data volume (effect of the data compression) by the data compression device 610 can be anticipated. When the number of real numbers contained in the data of the data compression target is large, it is expected that the effect of reducing the data volume by the data compression device 100 will be large.

According to the data compression device 610, because the data volume required to express the data is small, it is expected that the time required to transmit the data will be short.

Furthermore, according to the data generated by the data compression device 610, the original real numbers can be reproduced based on the integers represented by the data, and the step size. In this way, according to the data compression device 610, it is possible to reversibly compress the data.

The step size determination unit 611 can, for example, be implemented using the functions of the step size determination unit 122 in FIG. 1 and the like. The integer calculation unit 612 can, for example, be implemented using the functions of the integer calculation unit 123 in FIG. 1 and the like.

Figure 11:
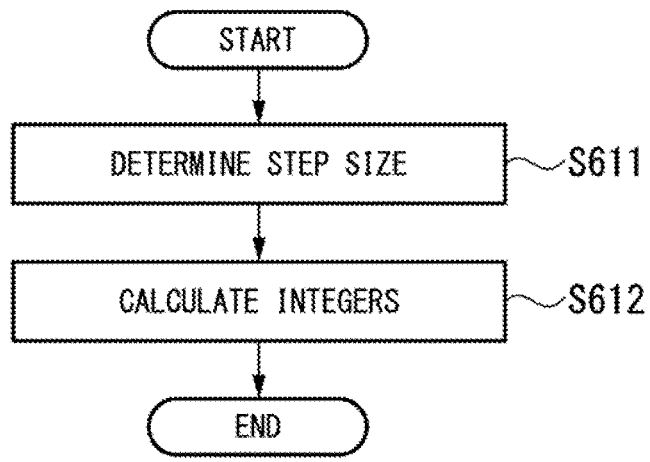
FIG. 11 is a diagram showing an example of the processing procedure of a data compression method according to some example embodiments of the present disclosure.

FIG. 11 is a diagram showing an example of the processing procedure of a data compression method according to some example embodiments of the present disclosure. The data compression method shown in FIG. 11 includes determining a step size (step S611) and calculating integers (step S612).

In the step of determining a step size (step S611), a computer determines, based on the significant figures of each of a plurality of real numbers, a step size that is a value capable of dividing without remainder each of the plurality of real numbers.

In the step of calculating integers (step S612), a computer calculates integers by dividing each of the plurality of real numbers by the step size.

According to the data compression method shown in FIG. 11, the plurality of real numbers can be expressed by integers corresponding to each of the plurality of real numbers, and a single real number that expresses the step size. Therefore, the number of real numbers used to express the data can be reduced. According to the data compression method shown in FIG. 11, in this respect, it is expected that the data volume required to represent a plurality of real numbers can be made relatively small.

In particular, when the data volume required to express an integer is smaller than the data volume required to express a real number, the effect of reducing the data volume (effect of the data compression) by the data compression method shown in FIG. 11 can be anticipated. When the number of real numbers contained in the data of the data compression target is large, it is expected that the effect of reducing the data volume by the data compression method shown in FIG. 11 will be large.

According to the data compression method shown in FIG. 11, because the data volume required to express the data is small, it is expected that the time required to transmit the data will be short.

Furthermore, according to the data generated by the data compression method shown in FIG. 11, the original real numbers can be reproduced based on the integers represented by the data, and the step size. In this way, according to the data compression method shown in FIG. 11, it is possible to reversibly compress the data.

Figure 12:
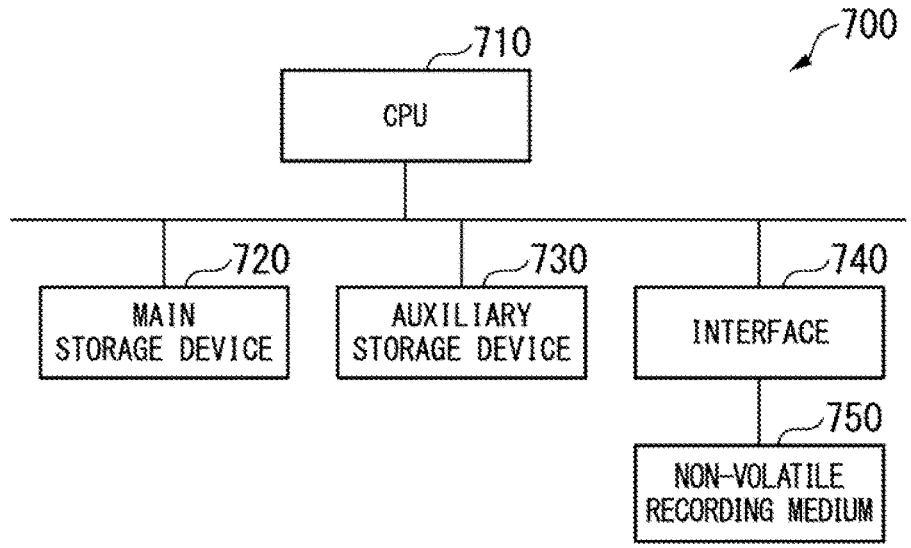
FIG. 12 is a schematic block diagram showing a configuration of a computer according to at least one example embodiment.

FIG. 12 is a schematic block diagram showing a configuration of a computer according to at least one example embodiment.

In the configuration shown in FIG. 12, a computer 700 includes a CPU 710, a main storage device 720, an auxiliary storage device 730, an interface 740, and a non-volatile recording medium 750.

Any one or more of the data compression device 100, the data compression device 200, and the data compression device 610, or a portion thereof, may be implemented by the computer 700. In this case, the operation of each of the processing units described above is stored in the auxiliary storage device 730 in the form of a program. The CPU 710 reads the program from the auxiliary storage device 730, expands the program in the main storage device 720, and executes the processing described above according to the program. Furthermore, the CPU 710 reserves a storage area corresponding to each of the storage units in the main storage device 720 according to the program. The communication of each device with other devices is executed as a result of the interface 740 having a communication function and performing communication according to the control of the CPU 710. Furthermore, the interface 740 includes a port for the non-volatile recording medium 750, and reads information from the non-volatile recording medium 750 and writes information to the non-volatile recording medium 750.

When the data compression device 100 is implemented by the computer 700, the operation of the QUBO matrix input unit 110, the QUBO matrix compression unit 120, the QUBO matrix transmission unit 130, and each unit thereof is stored in the auxiliary storage device 730 in the form of a program. The CPU 710 reads the program from the auxiliary storage device 730, expands the program in the main storage device 720, and executes the processing described above according to the program.

Furthermore, the CPU 710 reserves a storage area in the main storage device 720 for the data compression device 100 to perform processing according to the program. The data acquisition by the QUBO matrix input unit 110 and the transmission of data by the QUBO matrix transmission unit 130 is executed as a result of the interface 740 including a communication function and operating according to the control by the CPU 710. The interactions between the data compression device 100 and the user are executed as a result of the interface 740 having an input device and an output device, presenting information to the user through the output device under the control of the CPU 710, and receiving user operations through the input device.

When the data compression device 200 is implemented by the computer 700, the operation of the QUBO matrix input unit 210, the Ising calculator information input unit 220, the QUBO matrix conversion unit 230, and each unit thereof is stored in the auxiliary storage device 730 in the form of a program. The CPU 710 reads the program from the auxiliary storage device 730, expands the program in the main storage device 720, and executes the processing described above according to the program.

Furthermore, the CPU 710 reserves a storage area in the main storage device 720 for the data compression device 200 to perform processing according to the program. The data acquisition by the QUBO matrix input unit 210 and the transmission of data by the QUBO matrix transmission unit 250 is executed as a result of the interface 740 including a communication function and operating according to the control by the CPU 710. The interactions between the data compression device 200 and the user are executed as a result of the interface 740 having an input device and an output device, presenting information to the user through the output device under the control of the CPU 710, and receiving user operations through the input device.

When the data compression device 610 is implemented by the computer 700, the operation of the step size determination unit 611, the integer calculation unit 612, and each unit thereof is stored in the auxiliary storage device 730 in the form of a program. The CPU 710 reads the program from the auxiliary storage device 730, expands the program in the main storage device 720, and executes the processing described above according to the program.

Furthermore, the CPU 710 reserves a storage area in the main storage device 720 for the data compression device 610 to perform processing according to the program. The communication between the data compression device 610 and other devices is executed as a result of the interface 740 including a communication function and operating under the control of the CPU 710. The interactions between the data compression device 610 and the user are executed as a result of the interface 740 having an input device and an output device, presenting information to the user through the output device under the control of the CPU 710, and receiving user operations through the input device.

One or more of the programs described above may be recorded in the non-volatile recording medium 750. In this case, the interface 740 may read out the program from the non-volatile recording medium 750. Then, the CPU 710 directly executes the program that has been read out by the interface 740, or executes the program after temporarily saving it in the main storage device 720 or the auxiliary storage device 730.

A program for executing some or all of the processing performed by the data compression device 100, the data compression device 200, and the data compression device 610 may be recorded in a computer-readable recording medium, and the processing of each unit may be performed by a computer system reading and executing the program recorded on the recording medium. The "computer system" referred to here is assumed to include an OS (Operating System) and hardware such as a peripheral device.

Furthermore, the "computer-readable recording medium" refers to a portable medium such as a flexible disk, a magnetic optical disk, a ROM (Read Only Memory), or a CD-ROM (Compact Disc Read Only Memory), or a storage device such as a hard disk built into a computer system. Moreover, the program may be one capable of realizing some of the functions described above. In addition, the functions described above may be realized in combination with a program already recorded in the computer system.

Example embodiments of the present disclosure have been described in detail above with reference to the drawings. However, specific configurations are in no way limited to the example embodiments, and include designs and the like within a scope not departing from the spirit of the present disclosure.

The whole or part of the example embodiments above can be described as the supplementary notes below, but is not limited thereto.

(Supplementary Note 1)

A data compression device comprising:
 a memory configured to store instructions; and
 a processor configured to execute the instructions to:
  determine, based on a significant figure of each of a plurality of real numbers, a step size that is a value capable of dividing without remainder each of the plurality of real numbers; and
  acquire integers by dividing each of the plurality of real numbers by the step size.

(Supplementary Note 2)

The data compression device according to supplementary note 1,
 wherein the processor is configured to execute the instructions to:
 acquire data containing a plurality of real numbers; and
 detect a minimum value among the plurality of real numbers contained in the data, and
 wherein acquiring the integers comprises dividing, by the step size, values obtained by subtracting the minimum value from each of the plurality of real numbers contained in the data.

(Supplementary Note 3)

The data compression device according to supplementary note 2,
 wherein detecting the minimum value comprises: sorting the plurality of real numbers contained in the data; removing a duplicate real number from the sorted plurality of real numbers; and detecting the minimum value from the sorted plurality of real numbers from which the duplicate real number is removed, and
 wherein determining the step size comprises: calculating a difference between adjacent real numbers in the sorted plurality of real numbers from which the duplicate real number is removed; and determining the step size based on the calculated difference.

(Supplementary Note 4)

The data compression device according to supplementary note 1, wherein the plurality of real numbers are elements of a matrix in which all elements are expressed in decimal notation and as floating point numbers with three significant figures or less.

(Supplementary Note 5)

The data compression device according to supplementary note 4, wherein a significant figure in all non-zero elements among the elements of the matrix appears in a same place.

(Supplementary Note 6)

The data compression device according to supplementary note 4, wherein the matrix is a quadratic unconstrained binary optimization (QUBO) matrix.

(Supplementary Note 7)

The data compression device according to supplementary note 6, wherein the processor is configured to execute the instructions to change a value of an element of the QUBO matrix such that the value of the element satisfies a condition that is set in advance according to a characteristic of a quantum computer using the QUBO matrix.

(Supplementary Note 8)

The data compression device according to supplementary note 7, wherein changing the value of the element comprises changing the value of the element of the QUBO matrix such that the value of the element is expressed within a number of bits that is set in advance according to a characteristic of the quantum computer.

(Supplementary Note 9)

The data compression device according to supplementary note 7, wherein changing the value of the element comprises changing the value of the element of the QUBO matrix such that the value of the element is contained in a range that is set in advance according to a characteristic of the quantum computer.

(Supplementary Note 10)

The data compression device according to supplementary note 9, wherein changing the value of the element comprises performs scaling that is processing of dividing each element of the QUBO matrix by a same value or multiplying each element by a same value, such that the value of the element of the QUBO matrix is contained in the range.

(Supplementary Note 11)

The data compression device according to supplementary note 1, wherein determining the step size comprises, when a single problem is expressed using a plurality of matrices, and a significant figure appears in a different place for each matrix, determining a different step size for each matrix.

(Supplementary Note 12)

A data compression method executed by a computer, comprising:

determining, based on a significant figure of each of a plurality of real numbers, a step size that is a value capable of dividing without remainder each of the plurality of real numbers; and acquiring integers by dividing each of the plurality of real numbers by the step size.

(Supplementary Note 13)

A non-transitory recording medium storing a program that causes a computer to execute:

determining, based on a significant figure of each of a plurality of real numbers, a step size that is a value capable of dividing without remainder each of the plurality of real numbers; and acquiring integers by dividing each of the plurality of real numbers by the step size.

While preferred embodiments of the disclosure have been described and illustrated above, it should be understood that these are example of the disclosure and are not to be considered as limiting. Additions, omissions, substitutions, and other modifications can be made without departing from the scope of the present disclosure. Accordingly, the disclosure is not to be considered as being limited by the foregoing description, and is only limited by the scope of the appended claims.

What is claimed is:

1. A data compression device comprising:
a memory configured to store instructions; and
a processor configured to execute the instructions to:
   determine, based on a significant figure of each of a plurality of real numbers, a step size that is a value capable of dividing without remainder each of the plurality of real numbers; and
   acquire integers by dividing each of the plurality of real numbers by the step size.

2. The data compression device according to claim 1, wherein the processor is configured to execute the instructions to:
acquire data containing a plurality of real numbers; and
detect a minimum value among the plurality of real numbers contained in the data, and
wherein acquiring the integers comprises dividing, by the step size, values obtained by subtracting the minimum value from each of the plurality of real numbers contained in the data.

3. The data compression device according to claim 2, wherein detecting the minimum value comprises: sorting the plurality of real numbers contained in the data; removing a duplicate real number from the sorted plurality of real numbers; and detecting the minimum value from the sorted plurality of real numbers from which the duplicate real number is removed, and
wherein determining the step size comprises: calculating a difference between adjacent real numbers in the sorted plurality of real numbers from which the duplicate real number is removed; and determining the step size based on the calculated difference.

4. The data compression device according to claim 1, wherein the plurality of real numbers are elements of a matrix in which all elements are expressed in decimal notation and as floating point numbers with three significant figures or less.

5. The data compression device according to claim 4, wherein a significant figure in all non-zero elements among the elements of the matrix appears in a same place.

6. The data compression device according to claim 4, wherein the matrix is a quadratic unconstrained binary optimization (QUBO) matrix.

7. The data compression device according to claim 6, wherein the processor is configured to execute the instructions to change a value of an element of the QUBO matrix such that the value of the element satisfies a condition that is set in advance according to a characteristic of a quantum computer using the QUBO matrix.

8. The data compression device according to claim 7, wherein changing the value of the element comprises changing the value of the element of the QUBO matrix such that the value of the element is expressed within a number of bits that is set in advance according to a characteristic of the quantum computer.

9. The data compression device according to claim 7, wherein changing the value of the element comprises changing the value of the element of the QUBO matrix such that the value of the element is contained in a range that is set in advance according to a characteristic of the quantum computer.

10. The data compression device according to claim 9, wherein changing the value of the element comprises performs scaling that is processing of dividing each element of the QUBO matrix by a same value or multiplying each element by a same value, such that the value of the element of the QUBO matrix is contained in the range.

11. The data compression device according to claim 1, wherein determining the step size comprises, when a single problem is expressed using a plurality of matrices, and a significant figure appears in a different place for each matrix, determining a different step size for each matrix.

12. A data compression method executed by a computer, comprising:
determining, based on a significant figure of each of a plurality of real numbers, a step size that is a value capable of dividing without remainder each of the plurality of real numbers; and
acquiring integers by dividing each of the plurality of real numbers by the step size.

13. A non-transitory recording medium storing a program that causes a computer to execute:

determining, based on a significant figure of each of a plurality of real numbers, a step size that is a value capable of dividing without remainder each of the plurality of real numbers; and acquiring integers by dividing each of the plurality of real numbers by the step size.

* * * * *